US012761462B2

(12) United States Patent
Wong et al.

(10) Patent No.: US 12,761,462 B2
(45) Date of Patent: Oct. 13, 2026

(54) OPTICAL LENS ASSEMBLY WITH WIDE FIELD OF VIEW

(71) Applicant: 3M INNOVATIVE PROPERTIES COMPANY, St. Paul, MN (US)

(72) Inventors: Timothy L. Wong, West St. Paul, MN (US); John D. Le, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 372 days.

(21) Appl. No.: 18/282,867

(22) PCT Filed: Mar. 24, 2022

(86) PCT No.: PCT/IB2022/052709

§ 371 (c)(1),
(2) Date: Sep. 19, 2023

(87) PCT Pub. No.: WO2022/208249

PCT Pub. Date: Oct. 6, 2022

(65) Prior Publication Data

US 2024/0160005 A1 May 16, 2024

Related U.S. Application Data

(60) Provisional application No. 63/167,940, filed on Mar. 30, 2021.

(51) Int. Cl.
*G02B 17/08* (2006.01)
*G02B 25/00* (2006.01)
*G02B 27/01* (2006.01)

(52) U.S. Cl.
CPC ....... *G02B 25/001* (2013.01); *G02B 17/0804* (2013.01); *G02B 27/0172* (2013.01)

(58) Field of Classification Search
CPC ............ G02B 27/0172; G02B 17/0804; G02B 25/001
(Continued)

(56) References Cited

U.S. PATENT DOCUMENTS 3,443,858 A 5/1969 Russa
5,801,885 A 9/1998 Togino
(Continued)

FOREIGN PATENT DOCUMENTS

CN 104698572 A 6/2015
WO 2018163035 A1 9/2018
WO 2018211405 A2 11/2018

OTHER PUBLICATIONS

International Search Report for PCT International Application No. PCT/IB2022/052709, mailed on Jun. 21, 2022, 5 pages.
(Continued)

*Primary Examiner* — James R Greece
(74) *Attorney, Agent, or Firm* — Jonathan L. Tolstedt

(57) ABSTRACT

An optical lens assembly includes a first optical lens having opposing first and second major surfaces and facing a second lens having opposing third and fourth major surfaces. The second and third major surfaces face each other. The first through fourth major surfaces having respective sags, S1-S4, wherein each of the sags is defined by: (1) where c is 1/radius of curvature of the major surface, k is the conic constant of the surface, r is a distance from an optical axis, and a is an aspheric deformation constant. The first major surface includes a convex central portion surrounded by an annular concave outer portion, the second major surface is convex, the third major surface is substantially planar, and the fourth major surface is convex, wherein for r extending from about 1 mm to at least about 25 mm: $-0.7 \leq S1/S2 \leq 1$ $-0.2 \leq S1/S4 \leq 0.4$.
(Continued)

$$S = \frac{cr^2}{1+\sqrt{1-(1+k)c^2r^2}} + \alpha_2 r^4 + \alpha_3 r^6 + \alpha_4 r^8 \quad \text{Formula (i)}$$

20 Claims, 15 Drawing Sheets

(58) Field of Classification Search
USPC .......................................................... 359/643
See application file for complete search history.

(56) References Cited

U.S. PATENT DOCUMENTS

| | | | |
|---|---|---|---|
| 6,075,651 | A | 6/2000 | Hoppe |
| 9,945,999 | B2 | 4/2018 | Wong et al. |
| 10,330,930 | B2 | 6/2019 | Wong et al. |
| 10,747,003 | B2 | 8/2020 | Ouderkirk et al. |
| 2002/0024743 | A1 | 2/2002 | Endo et al. |
| 2010/0118217 | A1 | 5/2010 | Yoon |
| 2019/0384070 | A1 | 12/2019 | Geng et al. |
| 2020/0041773 | A1 | 2/2020 | Kim |

OTHER PUBLICATIONS

Wong, "Folded Optics with Birefringent Reflective Polarizers", 2017, Digital Optical Technologies, Proceedings of SPIE, vol. 10524, pp. 103350E-1-103350E-7, XP060092164.

OPTICAL LENS ASSEMBLY WITH WIDE FIELD OF VIEW

CROSS REFERENCE TO RELATED APPLICATIONS

This application is a national stage filing under 35 U.S.C. 371 of PCT/IB2022/052709, filed Mar. 24, 2022, which claims the benefit of U.S. Provisional Application No. 63/167,940, filed Mar. 30, 2021, the disclosures of which are incorporated by reference in their entireties herein.

SUMMARY

In some aspects of the present description, an optical lens assembly is provided, the optical lens assembly including an optical axis and a first optical lens having opposing first and second major surfaces and facing a second lens having opposing third and fourth major surfaces. The second and third major surfaces face each other. The first through fourth major surfaces have respective sags S1-S4, wherein each of the sags is defined by the equation:

$$S = \frac{cr^2}{1+\sqrt{1-(1+k)c^2r^2}} + \alpha_2 r^4 + \alpha_3 r^6 + \alpha_4 r^8$$

where c is 1/radius of curvature of the major surface, k is the conic constant of the surface, r is a distance from the optical axis, and a is an aspheric deformation constant. The first major surface includes a convex central portion surrounded by an annular concave outer portion. The second major surface is convex, the third major surface is substantially planar, and the fourth major surface is convex. For values of r extending from about 1 millimeter (mm) to at least about 25 mm, the ratio of S1/S2 is greater than or equal to about −0.7 and less than or equal to about 1, and the ratio S1/S4 is greater than or equal to about −0.2 and less than or equal to about 0.4. A best fourth-order polynomial fit to each of the S1/S2 and S1/S4 ratios has an r-squared value greater than about 0.95.

In some aspects of the present description, an optical lens assembly is provided, the optical lens assembly including an optical axis and a first optical lens having opposing first and second major surfaces and facing a second optical lens having opposing third and fourth major surfaces. The second and third major surfaces face each other. The first major surface includes a convex central portion surrounded by an annular concave outer portion. The second major surface is convex, the third major surface is substantially planar, and the fourth major surface is convex. The first through fourth major surfaces have respective sags S1-S4 as a function of radial distance r from the optical axis, wherein S1*S2 has a first local peak at a first radial distance r1, and S1*S2/S4 has a second local peak at a second distance r2 different from r1. When a substantially collimated light beam with a beam diameter of between about 4 mm and about 6 mm, or between about 3 mm and about 7 mm, from an object with a spatial frequency of between about 15 to about 25 line pairs per millimeter propagates along a first direction, the first direction making a first angle of at least 15 degrees with the optical axis, intersects the optical axis at a first distance of greater than about 20 mm from the first major surface and is incident on the first major surface side of the optical lens assembly and focuses to a focal spot after going through at least each of the first and second optical lenses, a modulation transfer function (MTF) of the optical lens assembly for the incident light beam at the focal spot for a static, forward-gazing pupil is greater than about 0.7.

In some aspects of the present description, an optical lens assembly is provided, the optical lens assembly including an optical axis and at least first and second optical lenses. The first and second optical lenes include a first major surface with a convex central portion surrounded by an annular concave outer portion, a convex second major surface, and a convex third major surface. The first through third major surfaces have respective sags S1, S2, and S4 defined as a function of radial distance r from the optical axis, wherein S1*S2/S4 has a local minimum. A partial reflector is disposed on and substantially conforms to the third major surface. A reflective polarizer is disposed on and substantially conforms to the second major surface. The optical lens assembly is configured to have focus that is adjustable across a diopter range extending at least from about −5 diopters to about 2 diopters by at least axially changing a separation between the first and second optical lenses, such that for each diopter in the diopter range, the diopter curvature is less than about 1 diopter as a field of view angle changes from about zero degrees to about 30 degrees. For the purposes of this specification, the term “diopter curvature” shall be defined to mean “the total range of focus adjustment by the human eye or an objective lens necessary to sharply view different points of the image across the field of view, as measured in diopters.”

In some aspects of the present description, an optical lens assembly is provided, the optical lens assembly including an optical axis and a first optical lens with opposing first and second major surfaces. The first optical lens faces a second optical lens with opposing third and fourth major surfaces. The second and third major surfaces face each other. The first through fourth major surfaces have respective sags S1-S4, wherein each of the sags is defined by:

$$S = \frac{cr^2}{1+\sqrt{1-(1+k)c^2r^2}} + \alpha_2 r^4 + \alpha_3 r^6 + \alpha_4 r^8$$

where c is 1/radius of curvature of the major surface, k is the conic constant of the surface, r is a distance from the optical axis, and a is an aspheric deformation constant. The first major surface includes a convex central portion surrounded by an annular concave outer portion, the second major surface is convex, the third major surface is substantially planar, and the fourth major surface is convex. For the first major surface: $0.0035 \le c \le 0.006$ mm$^{-1}$, $-3 \le k \le -1.5$, and $-5\text{E-}06 \le a_2 \le -3\text{E-}06$. For the second major surface: $-0.006 \le c \le 0.004$ mm$^{-1}$, $30 \le k \le 37$, and $0.5\text{E-}06 \le a_2 \le 2\text{E-}06$. The fourth major surface is substantially a spherical surface having a radius of curvature between about −85 mm and about −60 mm.

In some aspects of the present description, an optical lens assembly is provided, the optical lens assembly including an optical axis and at least first and second optical lenses. The first and second optical lenses together include at least a first major surface, a convex second major surface, and a convex third major surface, a partial reflector disposed on and substantially conforming to the third major surface, and a reflective polarizer disposed on and substantially conforming to the second major surface. The optical lens assembly is configured to have a focus that is adjustable across a diopter range extending at least from about −8 diopters to about 3 diopters by at least axially changing a separation between the first and second optical lenses, such that for each focus position in the focus adjustment range, a height of an object needed to produce a virtual image with a field of view of 95 degrees varies by less than about 10%, or a height of an object needed to produce a virtual image with a field of view of 60 degrees varies by less than about 5%.

DETAILED DESCRIPTION

Figure 1:
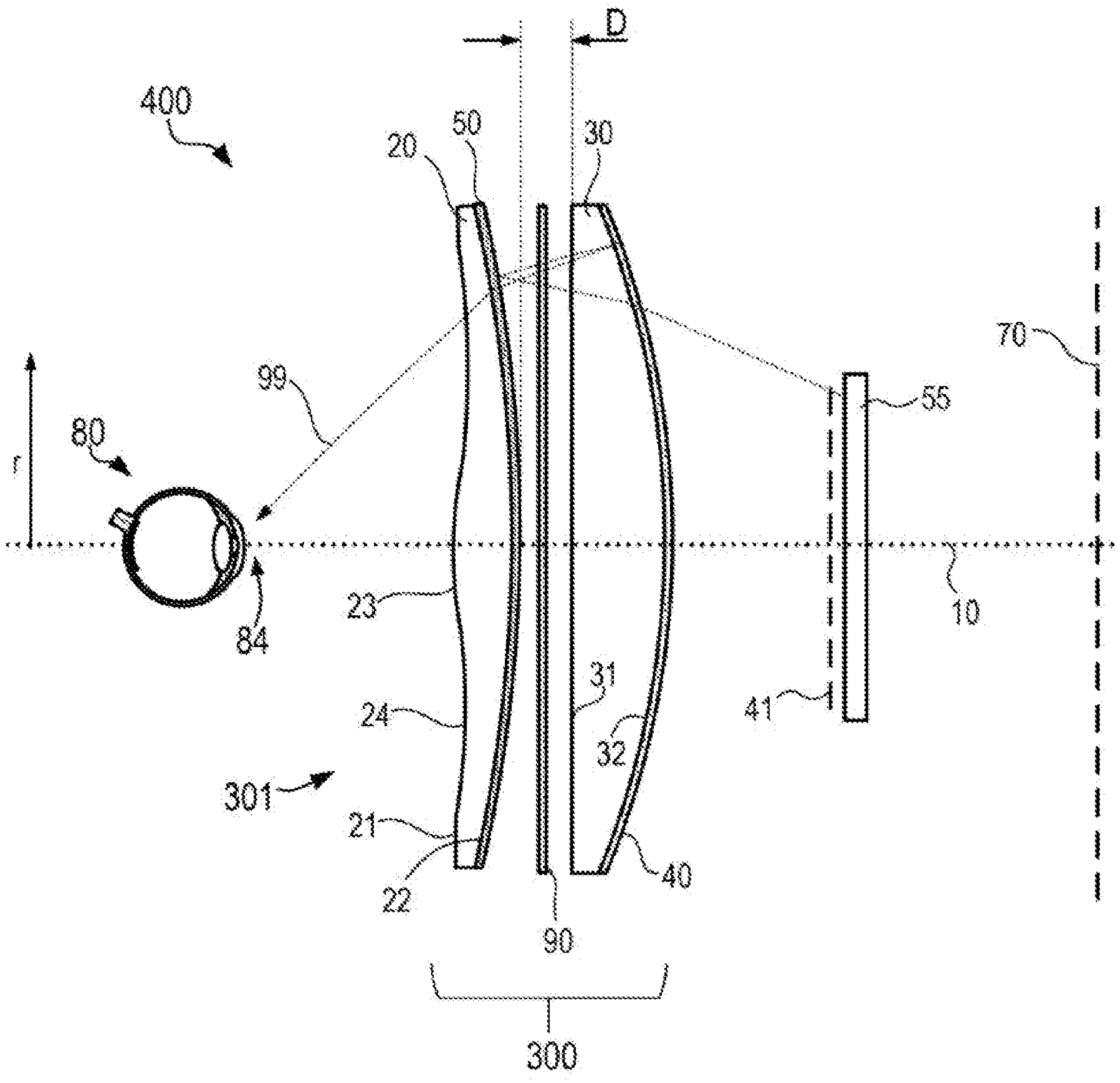
FIG. 1 is a side cutaway view of an optical system including an optical lens assembly, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, an optical lens assembly includes an optical axis and a first optical lens having opposing first and second major surfaces and facing a second optical lens having opposing third and fourth major surfaces. In some embodiments, the second and third major surfaces may face each other. In some embodiments, the first through fourth major surfaces may have respective sags, S1-S4, wherein each of the sags may be defined by the equation:

$$S = \frac{cr^2}{1 + \sqrt{1 - (1 + k)c^2r^2}} + \alpha_2 r^4 + \alpha_3 r^6 + \alpha_4 r^8$$

where c is 1/radius of curvature of the major surface, k is the conic constant (i.e., the Schwarzschild constant) of the surface, r is a distance from the optical axis, and a is an aspheric deformation constant. In some embodiments, the first major surface may include a convex central portion surrounded by an annular concave outer portion. In some embodiments, the second major surface may be convex, the third major surface may be substantially planar, and the fourth major surface may be convex. In some embodiments, for values of r extending from about 1 mm to at least about 25 mm, the ratio of S1/S2 may be greater than or equal to about −0.7 and less than or equal to about 1, and the ratio of S1/S4 may be greater than or equal to about −0.2 and less than or equal to about 0.4. In some embodiments, a best fourth-order polynomial fit to each of the S1/S2 and S1/S4 ratios may have an r-squared value greater than about 0.95.

In some embodiments, the optical lens assembly may further include a partial reflector (e.g., a 50/50 beamsplitter layer or coating) disposed on and substantially conforming to the fourth major surface. In some embodiments, the optical lens assembly may further include a reflective polarizer disposed on and substantially conforming to the second major surface. In some embodiments, for a substantially normally incident light and a visible (i.e., human-visible) wavelength range extending from about 420 nm to about 680 nm, the partial reflector may have an average reflectance of at least 30% and an average transmittance of at least 30% for each of orthogonal first and second polarization states, and the reflective polarizer may have an average reflectance of at least 60% for the first polarization state and an average transmittance of at least 60% for the second polarization state. For example, the reflective polarizer may have an average reflectance of at least 60%, or at least 65%, or at least 70%, or at least 75%, of light having a p-pol linear polarization type, and the reflective polarizer may have an average transmittance of at least 60%, or at least 65%, or at least 70%, or at least 75%, of light having a s-pol linear polarization type. The polarization types discussed here are examples only and are not intended to be limiting.

In some embodiments, for a field of view of up to at least about 45 degrees, the optical lens assembly may have a monochromatic sagittal field curvature that varies by less than about 100, or less than about 95, or less than about 90, or less than about 85, microns. In some embodiments, for the field of view of up to the at least about 45 degrees, the optical lens assembly may further have a monochromatic tangential field curvature that varies by less than about 200, or less than about 190, or less than about 180, or less than about 170, or less than about 160, or less than about 150, or less than about 140, or less than about 135, microns.

In some embodiments, the optical lens assembly may also be a part of an optical system, the optical system further including a partial reflector disposed on and substantially conforming to the fourth major surface of the optical lens assembly, a reflective polarizer disposed on and substantially conforming to the second major surface, an optical system axis, and a display. In some embodiments, the optical lens assembly may form a virtual image of an image emitted by the display for viewing by the eye of an observer, when the eye is positioned proximate an eye-location on an eye-side of the optical lens assembly. In some embodiments, for each first virtual image location at a first field angle of between about 5 degrees and about 30 degrees relative to the optical system axis, when an imaging system is centered on an imaging system axis and is positioned proximate the eye-location and forms a real image of the virtual image corresponding to the first virtual image location, a resolution of the formed image may increase as the imaging system is at least rotated so that the imaging system axis approaches the first field angle. Stated another way, the perceived resolution of the virtual image may increase as the imaging system is rotated from the optical system axis toward the first field angle.

In some embodiments, the optical lens assembly of the optical system may be configured such that it is nearly telecentric. For the purposes of this specification, the term "telecentric" shall be defined to mean that adjustments to the optical lens assembly to change the focus (e.g., to change a focus of the optical lens assembly from −5 diopters to −4 diopters) will cause no change in the magnification of the optical system. The term "nearly telecentric" will be defined to mean that adjustments to the optical lens assembly to change the focus will result in changes in magnification which are limited to a small percentage, such as less than 5%, or less than 4%, or less than 3%.

For the purposes of the specification, the term "magnification" shall be defined as the ratio of the angle subtended by an image of an object formed by an optical lens assembly angle to the angle subtended by an object at a near point (e.g., the near point of human vision of about 25 cm). For example, if an object (e.g., a candle) subtends an angle of 10 degrees at about 25 cm when viewed by a human observer ($\theta_{object}$), and the image of the object when viewed through the optical lens assembly with the object at the focal plane of the optical lens assembly subtends an angle of 20 degrees ($\theta_{image}$), then the magnification, M, of the optical lens assembly is:

$$M=\theta_{image}/\theta_{object}=20°/10°=2$$

Magnification may also be considered in terms of a desired field of view for an optical lens assembly. For example, an object viewed through the optical lens assembly may produce a virtual image with a field of view of 60 degrees when the optical lens assembly is at one focus (e.g., −5 diopters). If the optical lens assembly is adjusted to another focus (e.g., −4 diopters), and the height of the object needed to produce that same field of view (60 degrees) changes (increases or decreases), then the magnification of the system changes as the focus changes, and the system is not considered perfectly telecentric.

In some embodiments, the optical system described herein may be configured such that, for a diopter range extending at least from about −8 diopters to about 3 diopters, a magnification of the virtual image changes by less than about 4.5% over a 95-degree field of view. In some embodiments, the optical system may be configured such that, for a diopter range extending at least from about −8 diopters to about 3 diopters, a height of an object needed to produce a virtual image with a field of view of 95 degrees varies by less than about 4.5%. In some embodiments, the optical system may be configured such that, for a diopter range extending at least from about −5 diopters to about 1 diopters, a height of an object needed to produce a virtual image with a field of view of 95 degrees varies by less than about 2.7%. In some embodiments, the optical system may be configured such that, for a diopter range extending at least from about −4 diopters to about 0 diopters, a height of an object needed to produce a virtual image with a field of view of 95 degrees varies by less than about 1.9%.

In some embodiments, the optical system described herein may be configured such that, for a diopter range extending at least from about −8 diopters to about 3 diopters, a magnification of the virtual image changes by less than about 2.5% over a 60-degree field of view. In some embodiments, the optical system may be configured such that, for a diopter range extending at least from about −8 diopters to about 3 diopters, a height of an object needed to produce a virtual image with a field of view of 60 degrees varies by less than about 2.5%. In some embodiments, the optical system may be configured such that, for a diopter range extending at least from about −5 diopters to about 1 diopters, a height of an object needed to produce a virtual image with a field of view of 60 degrees varies by less than about 1%. In some embodiments, the optical system may be configured such that, for a diopter range extending at least from about −4 diopters to about 0 diopters, a height of an object needed to produce a virtual image with a field of view of 60 degrees varies by less than about 0.6%.

According to some aspects of the present description, an optical lens assembly may include an optical axis and a first optical lens having opposing first and second major surfaces and facing a second optical lens having opposing third and fourth major surfaces. In some embodiments, the second and third major surfaces may face each other (that is, the first optical lens and the second optical lens may be disposed such that the second major surface of the first optical lens faces the third major surface of the second optical lens.) In some embodiments, the first major surface may have a convex central portion surrounded by an annular concave outer portion.

In some embodiments, the second major surface may be convex, the third major surface may be substantially planar, and the fourth major surface may be convex. In some embodiments, the first through fourth major surfaces may have respective sags S1-54, where sags S1-54 are defined as a function of radial distance r from the optical axis. In some embodiments, a plot of S1*S2 may have a first local peak (e.g., a local maximum) at a first radial distance r1, and a plot of S1*S2/S4 may have a second local peak (e.g., a local minimum) at a second distance r2 different from r1. In some embodiments, at least one of the ratios of S1/S2 and S1/S4 may be described by a fourth-order polynomial.

In some embodiments, when a substantially collimated light beam with abeam diameter of between about 4 mm and about 6 mm, or between about 3 mm and about 7 mm, from an object having a spatial frequency of between about 15 to about 25 line pairs (or between about 17 to about 23 line pairs, or between about 19 to about 23 line pairs) per millimeter propagates along a first direction and intersects the optical axis at a first distance of greater than about 20, or about 21, or about 22, or about 23, or about 24, or about 25, or about 26 mm from the first major surface and is incident on the first major surface side of the optical lens assembly and focuses to a focal spot after going through at least each of the first and second optical lenses, a modulation transfer function (MTF) of the optical lens assembly for the incident light beam at the focal spot for a static, forward-gazing pupil may be greater than about 0.7, or about 0.75, or about 0.8, or about 0.85. In some embodiments, the first direction may make a first angle of at least 15 degrees with the optical axis. For the purposes of this application, the MTF as used above shall refer to the average of the sagittal and tangential MTF values. In some embodiments, the first distance may be less than about 30 mm, or less than about 29 mm, or less than about 28 mm from the first major surface. In some embodiments, the substantially collimated light beam may have a full divergence angle of less than about 5 degrees, or less than about 3 degrees, or less than about 1 degree.

According to some aspects of the present description, an optical lens assembly may include an optical axis and at least first and second optical lenses. The first and second optical lens may include a first major surface having a convex central portion surrounded by an annular concave outer portion, a convex second major surface, and a convex third major surface. In some embodiments, the first through third major surfaces having respective sags S1, S2, and S4 as a function of radial distance r from the optical axis, such that a plot of S1*S2/S4 has a local minimum. In some embodiments, a partial reflector may be disposed on and substantially conform to the third major surface. In some embodiments, a reflective polarizer may be disposed on and substantially conform to the second major surface. In some embodiments, the optical lens assembly may be configured to have focus that is adjustable across a diopter range extending at least from about −5 diopters to about 2 diopters by at least axially changing a separation, D, between the first and second optical lenses. In some embodiments, for each focus position in the focus adjustment range, the diopter curvature may be less than about 1 diopter as a field of view angle changes from about zero degree to about 30 degrees, or about 35 degrees. In some embodiments, the diopter curvature may be less than about 0.5 diopters, or less than about 0.4 diopters, or less than about 0.3 diopters, or less than about 0.2 diopters, or less than about 0.1 diopters as the field of view angle changes from about zero degree to about 15 degrees, or about 10 degrees.

According to some aspects of the present description, an optical lens assembly may include an optical axis and a first optical lens having opposing first and second major surfaces, and facing a second lens having opposing third and fourth major surfaces. In some embodiments, the second and third major surfaces may face each other. In some embodiments, the first through fourth major surfaces may have respective sags S1-S4, wherein each of the sags is defined by:

$$S = \frac{cr^2}{1 + \sqrt{1 - (1+k)c^2r^2}} + \alpha_2 r^4 + \alpha_3 r^6 + \alpha_4 r^8$$

where c is 1/radius of curvature of the major surface, k is the conic constant of the surface, r is a distance from the optical axis, and a is an aspheric deformation constant. In some embodiments, the first major surface may include a convex central portion surrounded by an annular concave outer portion, the second major surface may be convex, the third major surface may be substantially planar, and the fourth major surface may be convex. In some embodiments, for the first major surface: $0.0035\ mm^{-1} \leq c \leq 0.006\ mm^{-1}$, $-3 \leq k \leq -1.5$, and $-5E\text{-}06 \leq a_2 \leq -3E\text{-}06$. In some embodiments, for the second major surface: $-0.006\ mm^{-1} \leq c \leq 0.004\ mm^{-1}$, $30 \leq k \leq 37$, and $0.5E\text{-}06 \leq a_2 \leq 2E\text{-}06$. In some embodiments, the fourth surface may be substantially a spherical surface having a radius of curvature between about −85 mm and about −60 mm.

According to some aspects of the present description, an optical lens assembly includes an optical axis and at least first and second optical lenses. In some embodiments, the first and second optical lenses together may include at least a first major surface, a convex second major surface, and a convex third major surface, a partial reflector disposed on and substantially conforming to the third major surface, and a reflective polarizer disposed on and substantially conforming to the second major surface. In some embodiments, the optical lens assembly may be configured to have focus that is adjustable across a diopter range extending at least from about −8 diopters to about 3 diopters by at least axially changing a separation between the first and second optical lenses, such that for each focus position in the focus adjustment range, a height of an object needed to produce a virtual image with a field of view of 95 degrees varies by less than about 10%, or less than about 7%, or less than about 5%, or less than about 4.5%.

In some embodiments, the first major surface may include a convex central portion surrounded by an annular concave outer portion. In some embodiments, the first through third major surfaces may have respective sags S1, S2, and S4 as a function of radial distance r from the optical axis, wherein S1*S2/S4 has a local minimum.

In some embodiments of the optical lens assembly, for a diopter range extending at least from about −5 diopters to about 1 diopter, a height of an object needed to produce a virtual image with a field of view of 95 degrees varies by less than about 5%, or less than about 4%, or less than about 3%. In some embodiments, for a diopter range extending at least from about −4 diopters to about 0 diopters, a height of an object needed to produce a virtual image with a field of view of 95 degrees varies by less than about 3%, or less than about 2%. In some embodiments, for a diopter range extending at least from about −8 diopters to about 3 diopters, a height of an object needed to produce a virtual image with a field of view of 60 degrees varies by less than about 5%, or less than about 4%, or less than about 3%, or less than about 2.5%. In some embodiments, for a diopter range extending at least from about −5 diopters to about 1 diopter, a height of an object needed to produce a virtual image with a field of view of 60 degrees varies by less than about 3%, or less than about 2%, or less than about 1%. In some embodiments, for a diopter range extending at least from about −4 diopters to about 0 diopters, a height of an object needed to produce a virtual image with a field of view of 60 degrees varies by less than about 3%, or less than about 2%, or less than about 1%, or less than about 0.6%.

Turning now to the drawings, FIG. 1 is a side cutaway view of an optical system 400 including an optical lens assembly 300, according to the present description. In some embodiments, optical system 400 includes an optical system axis 10, an optical lens assembly 300, a display 55 configured to emit an image 41 for viewing by an eye 80 of an observer when the eye 80 is positioned on an eye-side 301 of the optical lens assembly 300.

In some embodiments, the optical lens assembly 300 may include a first optical lens 20 facing a second optical lens 30. In some embodiments, the first optical lens 20 may include a first major surface 21 and a second major surface 22. In some embodiments, the second optical lens 30 may include a third major surface 31 and a fourth major surface 32. The first optical lens 20 and second optical lens 30 may be disposed such that the second major surface 22 is facing the third major surface 31, as shown in FIG. 1.

Figure 2:
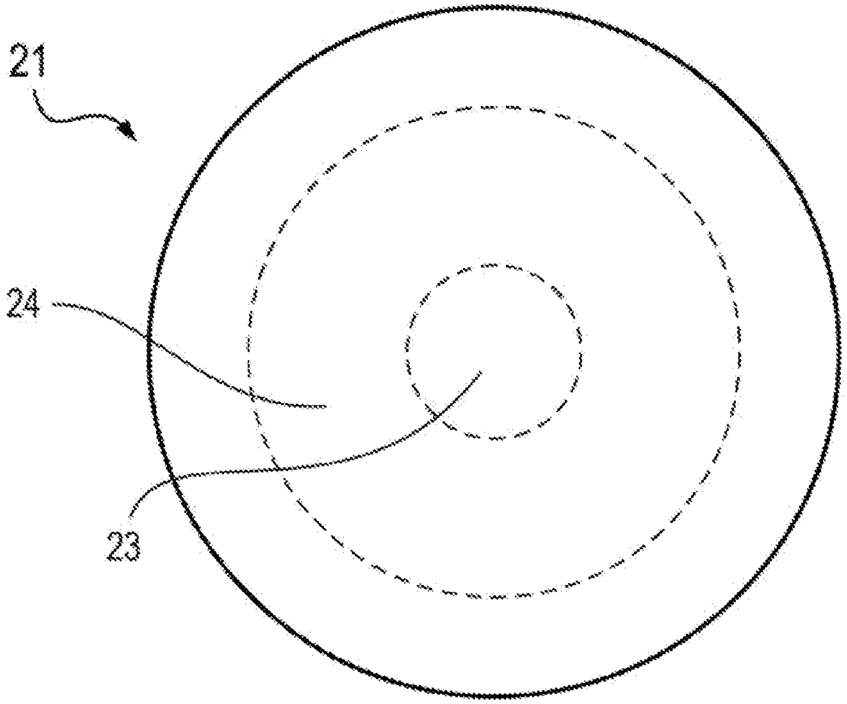
FIG. 2 is a front view of a surface of a lens including a convex central portion surrounded by an annular concave outer portion, in accordance with an embodiment of the present description.

In some embodiments, the first major surface 21 may include a convex central portion 23 surrounded by an annular concave outer portion 24 (see also FIG. 2 for a front view of first major surface 21 showing portions 23 and 24). In some embodiments, second major surface 22 may be convex, third major surface 31 may be substantially planar, and fourth major surface 32 may be convex. In some embodiments, each of the first through fourth major surfaces 21, 22, 31, 32 may have respective sags, S1, S2, S3, and S4, wherein each of the sags is defined by the formula:

$$S = \frac{cr^2}{1 + \sqrt{1 - (1+k)c^2r^2}} + \alpha_2 r^4 + \alpha_3 r^6 + \alpha_4 r^8$$

where c is 1/radius of curvature of the major surface, k is the conic constant (i.e., the Schwarzschild constant) of the surface, r is a distance from the optical axis, and a is an aspheric deformation constant. For additional detail on the sags of the four major surfaces, see at least FIGS. 3 and 4.

In some embodiments, for values of r extending from about 1 mm to at least about 25 mm, the following relationships may hold:

$$-0.7 \leq S1/S2 \leq 1 \text{ and}$$

$$-0.2 \leq S1/S4 \leq 0.4$$

Figure 5A:
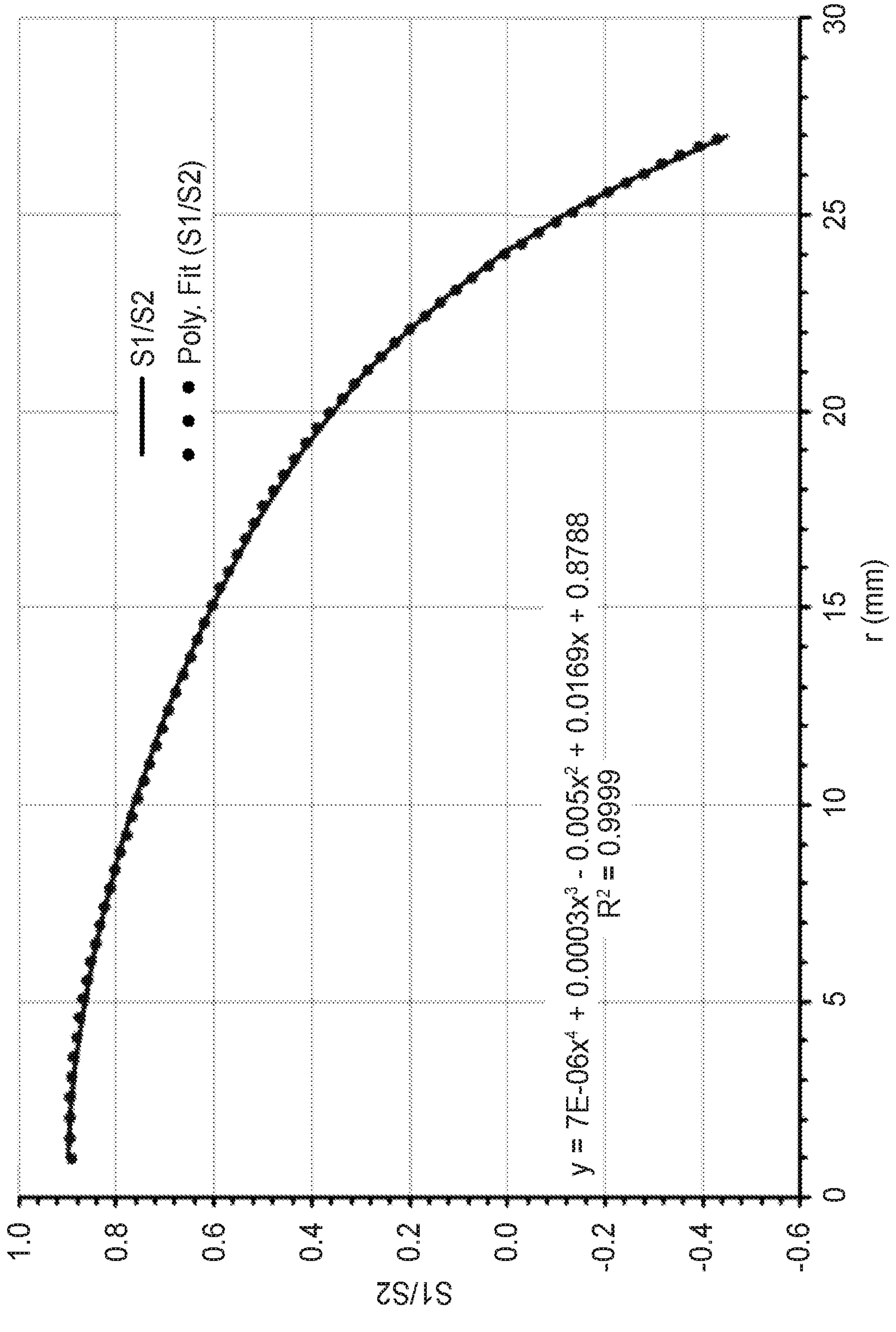
FIGS. 5A and 5B provided plots showing relationships between the various sags defined in FIG. 4, in accordance with an embodiment of the present description.
Figure 5B:
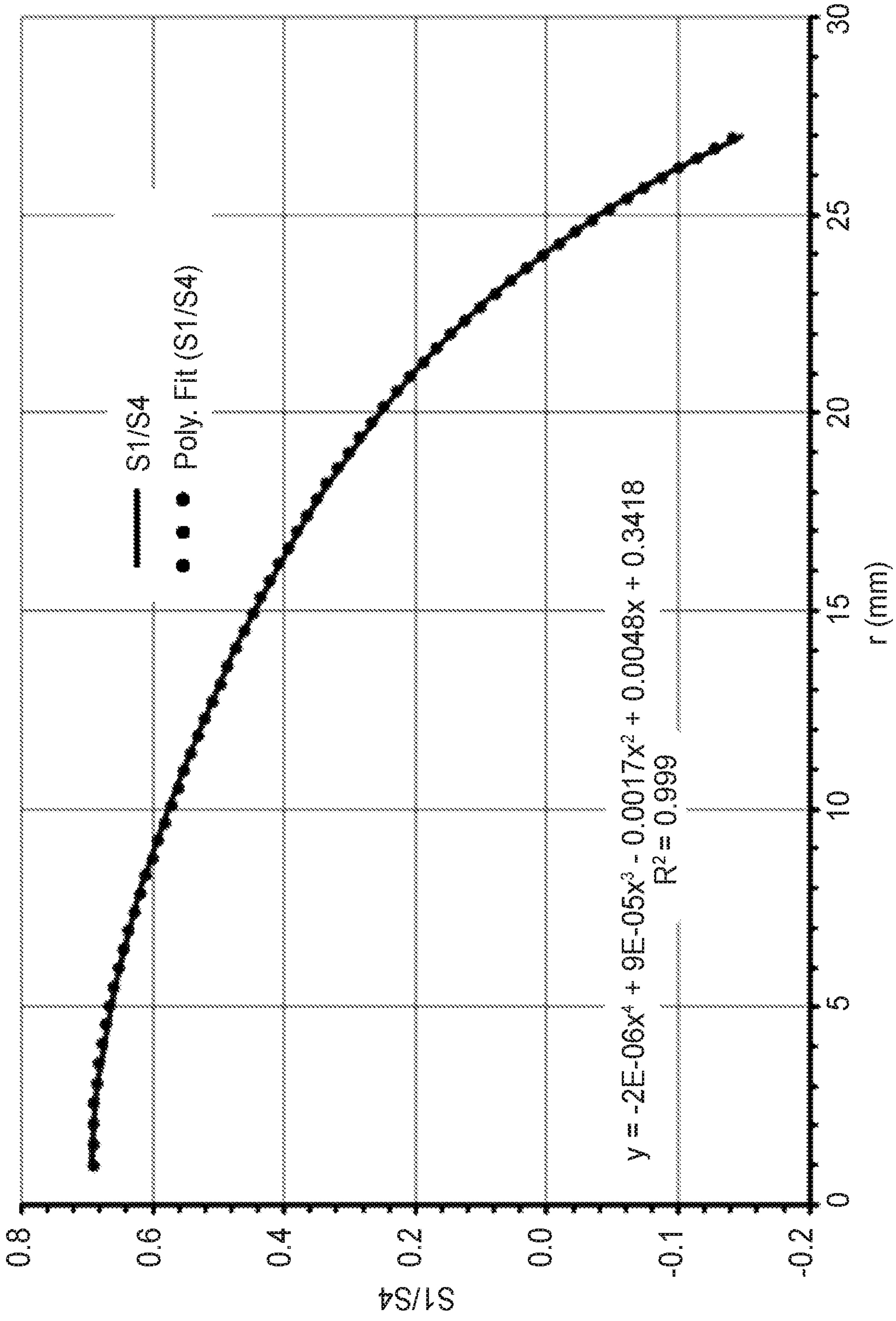

In some embodiments, a best fourth-order polynomial fit to each of the S1/S2 and S1/S4 has an r-squared value greater than about 0.95 (see also FIGS. 5A and 5B).

In some embodiments, the optical system 400 further includes a partial reflector 40 (e.g., a 50/50 beamsplitter coating or film) disposed on and substantially conforming to the fourth major surface 32, and a reflective polarizer 50 disposed on and substantially conforming to the second major surface 22. In some embodiments, the optical system 400 may form a virtual image 70 of the image 41 for viewing by eye 80. In some embodiments, optical system 400 may also include an optical retarder 90 (e.g., a quarter-wave plate) disposed between the first optical lens 20 and second optical lens 30.

For the purposes of this specification, the terms "optical system axis", "system axis", and "optical axis" are synonymous, and these terms shall be defined to mean an imaginary line defining a path along which light propagates through an optical system and around which the light path exhibits some degree of rotational symmetry. In some embodiments, an optical system axis may be folded (i.e., light may pass through, be reflected by, be refracted by, or otherwise affected by one or more optical components (e.g., lenses, optical films, optical retarders, etc.) such that the path of the light is folded rather than strictly linear). However, even in a system with a folded optical axis, as used herein, these terms shall be defined to be the imaginary line along which there is rotational symmetry in an optical system.

In some embodiments, the optical system axis 10 may be a folded optical system axis. In some embodiments, the optical system axis 10 may be folded so that a first segment of the optical system axis 10 substantially coincides with a different second segment of the optical system axis. For example, light ray 99 may pass from the display 55, through the partial reflector 40 and the optical retarder 90, be reflected off of the reflective polarizer 50, back through the optical retarder 90, and then reflected off of the partial reflector 40, back through the optical retarder 90 and the reflective polarizer 50 (as the polarization state has now changed after passing through the optical retarder three times) and finally leaves the eye-side 301 of the optical lens assembly 300 through the reflective polarizer 50 toward the eye 80 of the observer.

FIG. 2 is a front view of the first major surface 21 of first optical lens 20 of FIG. 1. First major surface 21 includes a convex central portion 23 (i.e., a rounded "hill" with a peak extending out of the image plane) surrounded by an annular concave outer portion 24 (i.e., a "moat" with a rounded bottom pushing into the image plane). The dashed lines are intended to indicate the approximate borders of the convex central portion 23 and annular concave outer portion 24 (the general relationship between the two surfaces), and are not intended to be limiting or to define specific dimensions.

Figure 3:
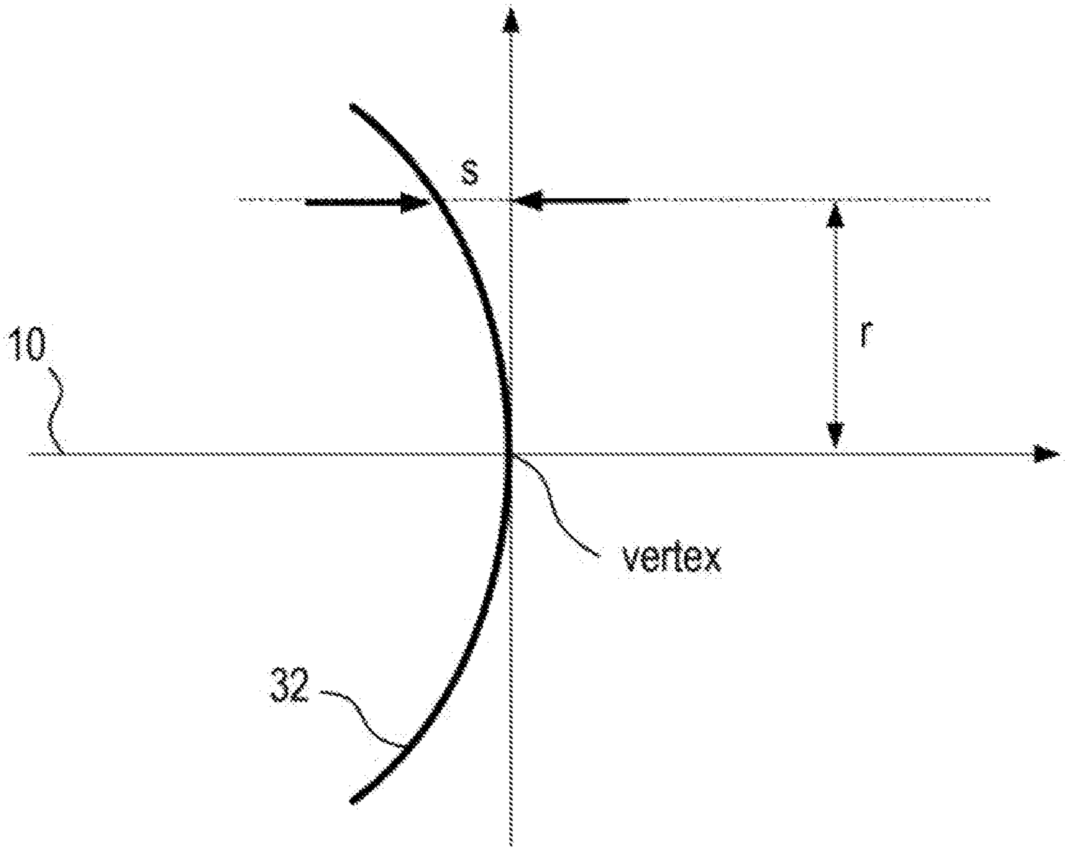
FIG. 3 is an illustration of the definition of sag for an optical lens, in accordance with an embodiment of the present description.

FIG. 3 is an illustration of the definition of sag for an optical lens, as used in the present description. As used herein, a given value of sag, s, is defined as a distance from a plane containing the vertex of the lens (such as a lens defined by fourth major surface 32 of FIG. 1) to the surface of the lens 32 for a given radius r from the optical system axis 10. The value of sag s will change over the surface of a given lens shape. For the surface 32 as shown in FIG. 3, the sag s increases with the increase in the value of r (distance from the optical system axis). For other surfaces, such as the first major surface 21 of FIGS. 1 and 2, the sag s may alternately increase and decrease with the distance r.

Figure 4:
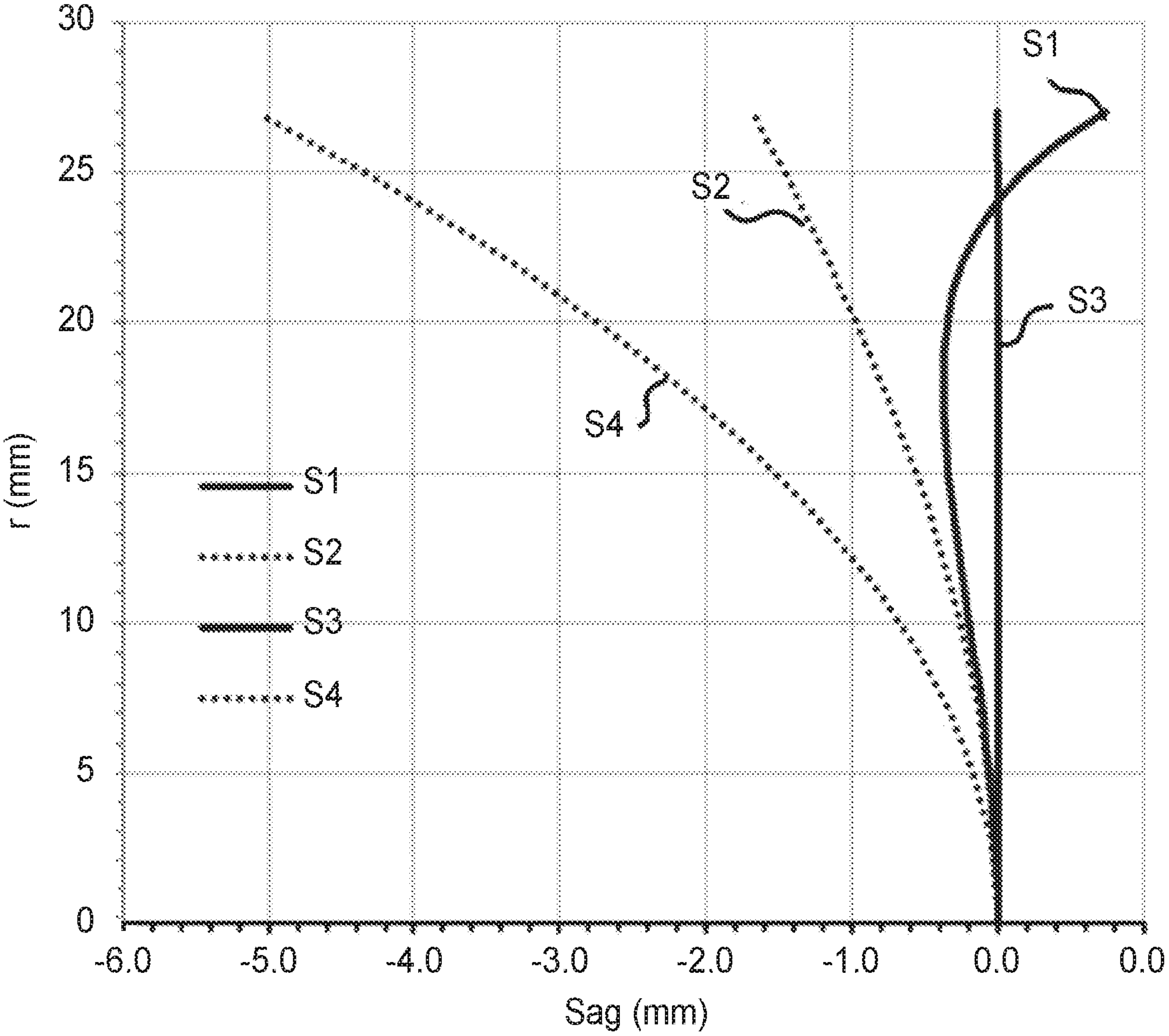
FIG. 4 is a plot of the sags for each of the four major surfaces of an optical lens assembly, in accordance with an embodiment of the present description.

FIG. 4 is a plot of the sags S1, S2, S3, and S4 for example embodiments of each of the four major surfaces 21, 22, 31, and 32, respectively, of optical lens assembly 300 as shown in FIG. 1. The x axis (i.e., bottom of the graph) shows the value in sag as measured in millimeters (mm) and the y axis (i.e., the vertical axis) shows the value of r (i.e., distance from the vertex) in mm. The sag plot S1 corresponding to first major surface 21 shows an increasing sag (created by the annular concave outer portion 24 of FIG. 2) at first switching over to a decreasing sag (at the end of annular concave outer portion 24, when the surface begins rising again. The sag plots S2 and S4 corresponding to second major surface 22 and fourth major surface 32 shows an increasing sag value as r increases (indicating a convex surface), and sag plot S3 for the third major surface 31 shows a non-changing sag value (indicating a substantially planar surface).

FIGS. 5A and 5B provided plots showing relationships between the various sags defined for the embodiments captured in FIG. 4. FIG. 5A shows the plot of the relationship S1/S2 (i.e., the sag of the first major surface 21 of FIG. 1 and second major surface 22 of FIG. 1). As previously discussed, for values of r extending from about 1 mm to at least about 25 mm, the value of S1/S2 is greater than or equal to about −0.7, and less than or equal to about 1.0. FIG. 5B shows the plot of the relationship S1/S4 (i.e., the sag of the first major surface 21 of FIG. 1 and fourth major surface 32 of FIG. 1). As previously discussed, for values of r extending from about 1 mm to at least about 25 mm, the value of S1/S4 is greater than or equal to about −0.2, and less than or equal to about 0.4. Each plot (FIG. 5A and FIG. 5B) shows two plot lines. The first line (solid) is the relationship of the sags for the two surfaces (S1/S2 for FIG. 5A, and S1/S4 for FIG. 5B), and the second line (dotted) shows a best fourth-order polynomial fit to each of the corresponding relationship plots. The equations of the plots and the actual R-squared values for the embodiments used are provided in FIGS. 5A and 5B.

Figure 6:
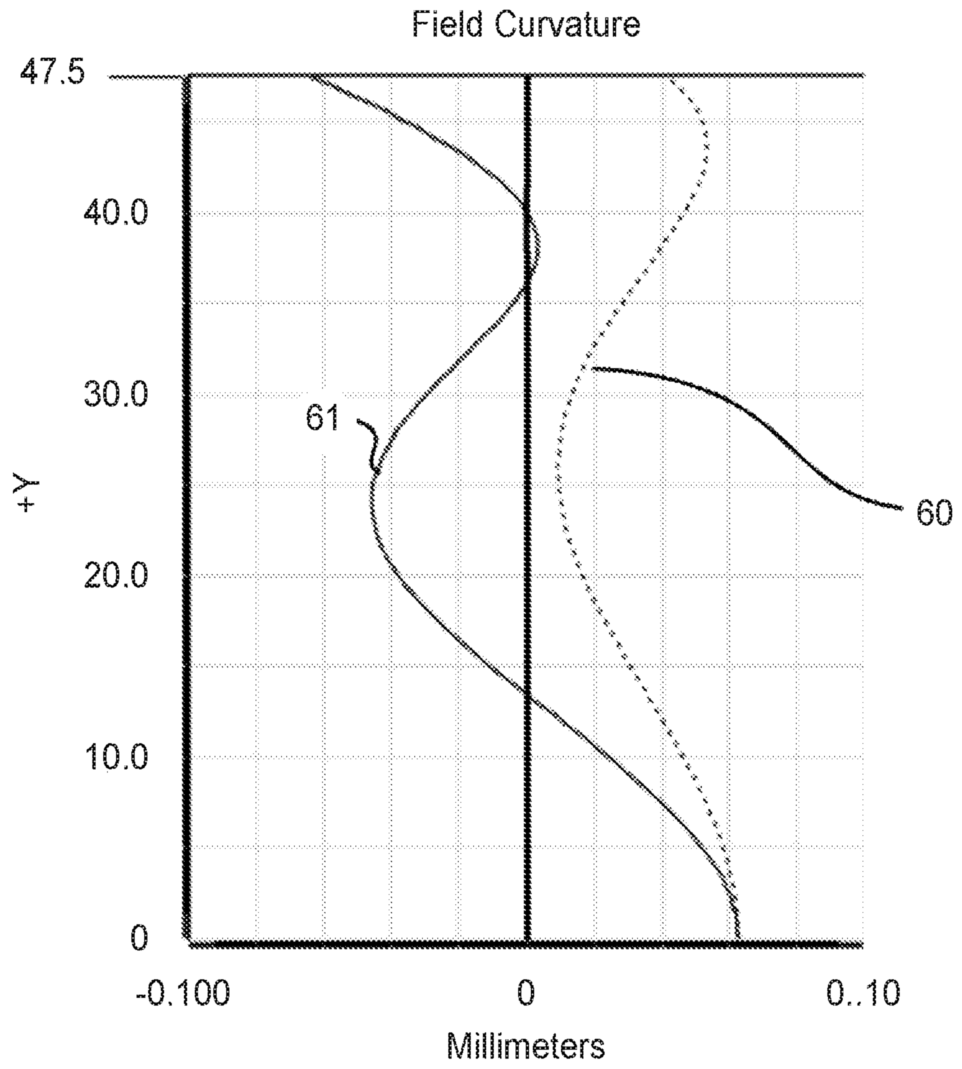
FIG. 6 shows plots of the sagittal and tangential field curvatures the optical lens assembly of FIG. 1, in accordance with an embodiment of the present description.

FIG. 6 shows plots of the sagittal (dotted line) and tangential (solid line) field curvatures for the optical lens assembly 300 of FIG. 1, according to the present description. The plots of FIG. 6 were generated with a nominal focus of −0.5 diopters/2.0 meters virtual image distance. Unless otherwise specified herein, this value is the nominal focus used to generate these and other plots provided herein. FIG. 6 shows the plot of the sagittal field curvature 60 (curvature along a horizontal plane cutting through the lens) for the embodiment of the optical lens assembly 300 of FIG. 1. As can be seen for the embodiment of FIG. 6, the optical lens assembly 300 has a sagittal field curvature 60 that varies by less than about 100 microns, or less than about 95 microns, or less than about 90 microns, or less than about 85 microns, or less than about 80 microns, or less than about 75 microns. FIG. 6 further shows the plot of the tangential field curvature 61 (curvature along a vertical plane cutting through the lens) for the embodiment of the optical lens assembly 300 of FIG. 1. As can be seen for the embodiment of FIG. 6, the optical lens assembly 300 has a tangential field curvature 61 that varies by less than about 200 microns, or less than about 190 microns, or less than about 180 microns, or less than about 170 microns, or less than about 160 microns, or less than about 150 microns, or less than about 140 microns, or less than about 135 microns.

Figure 7:
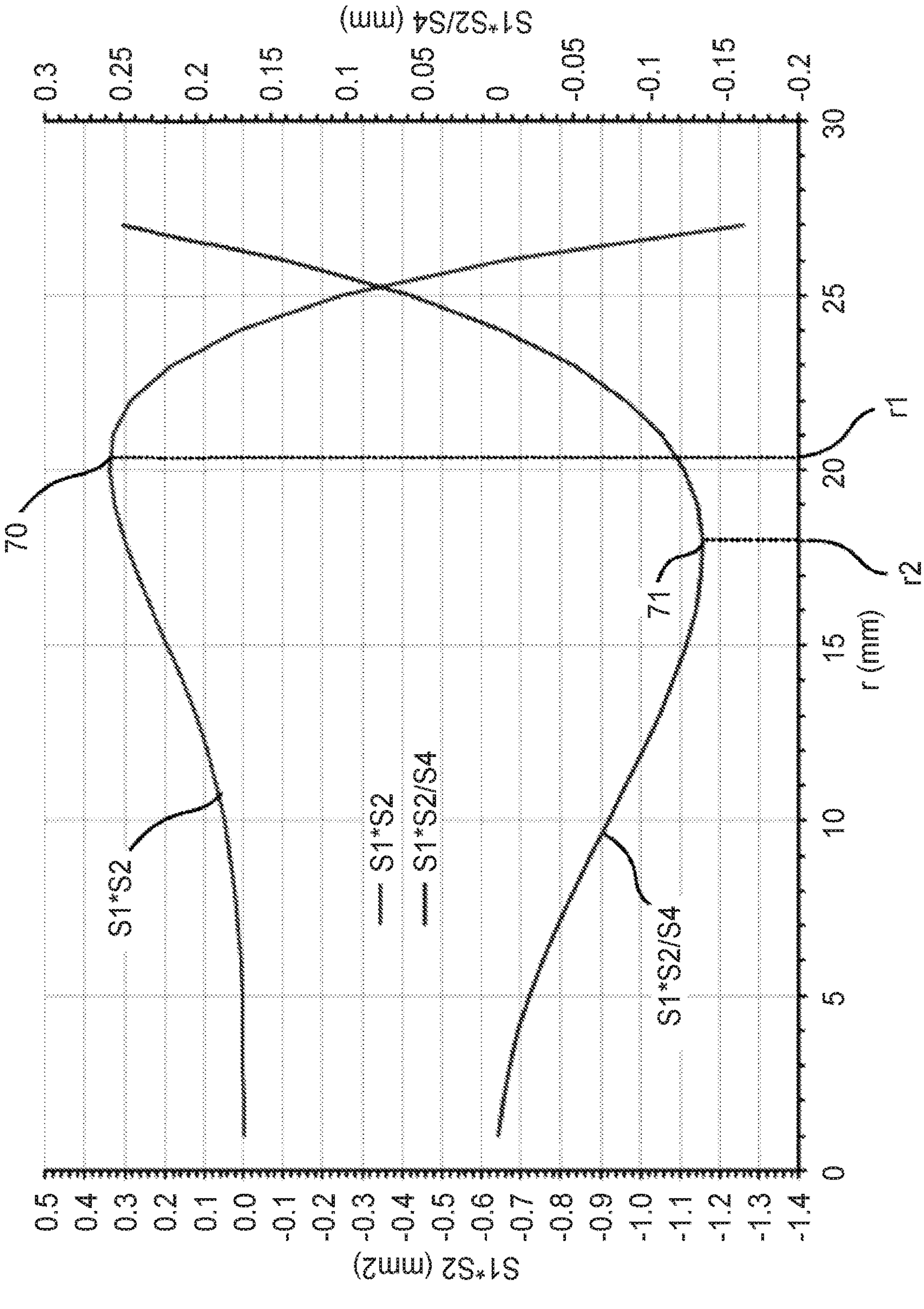
FIG. 7 is a plot of the relationships of the sags of some of the surfaces of the optical lens assembly of FIG. 1, in accordance with an embodiment of the present description.

FIG. 7 is a plot of additional relationships of the sags, S1-54, of the surfaces of the optical lens assembly 300 of FIG. 1, according to the present description. As a reminder, S1 represents the sag of the first major surface 21 (see FIG. 1), S2 represents the sag of the second major surface 22, S3 represents the sag of the third major surface 31, and S4 represents the sag of the fourth major surface 32. The plot lines in FIG. 7 represent the plot of the relationship S1*S2 and the plot of the relationship S1*S2/S4. In some embodiments, the plot of S1*S2 may have a first local peak 70 (e.g., a local maximum) at a first radial distance r1, and the plot of S1*S2/S4 may have a second local peak 71 (e.g., a local minimum) at a second distance r2 different from r1.

Figure 8A:
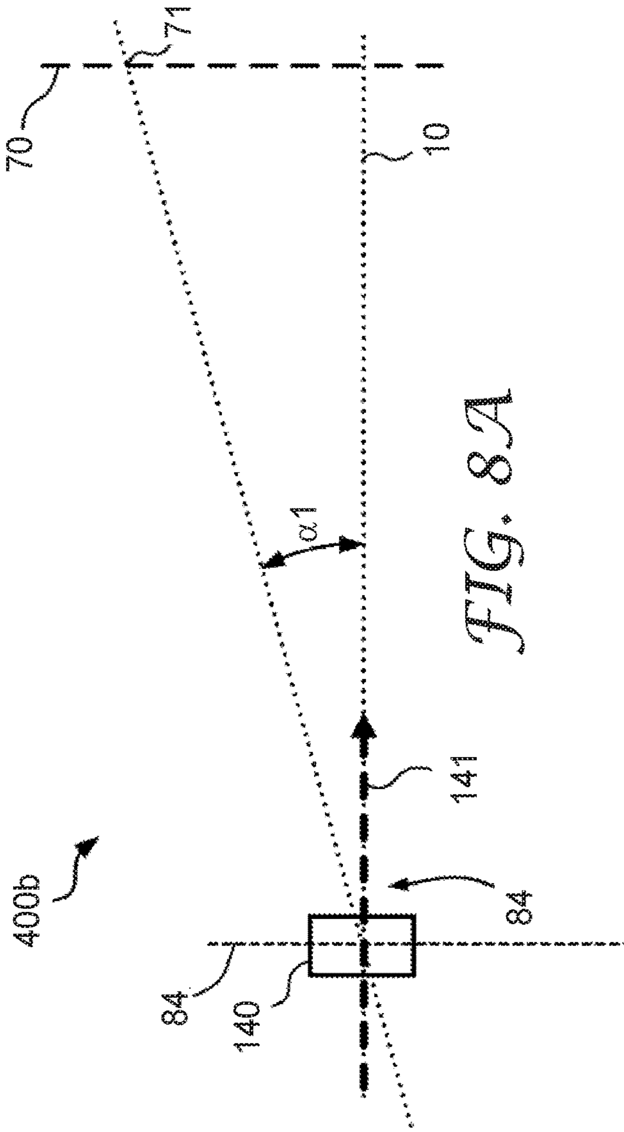
FIGS. 8A and 8B illustrate an optical system featuring an imaging system capable of perceiving a virtual image, in accordance with an embodiment of the present description.
Figure 8B:
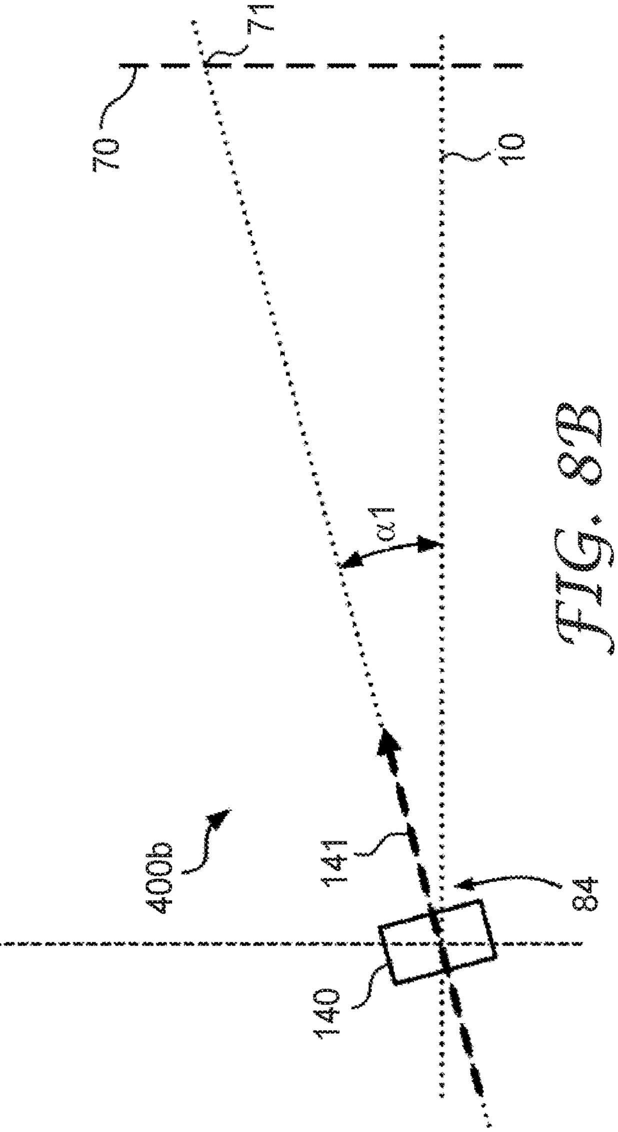

FIGS. 8A and 8B illustrate an optical system featuring an imaging system capable of perceiving a virtual image, according to the present description. As FIGS. 8A and 8B are simplified versions of the optical system 400 of FIG. 1, FIG. 1 should be examined together with FIGS. 8A and 8B for the following discussion. Some details have been left out of FIGS. 8A/8B for simplicity, and thus the optical system shall be referred to by 400*b* in FIGS. 8A and 8B.

Looking at FIGS. 1 and 8A, an optical system 400*b* includes the optical lens assembly of FIG. 1, including partial reflector 40 disposed on and substantially conforming to the fourth major surface 32, and reflective polarizer 50 disposed on and substantially conforming to the second major surface 22, an optical system axis 10, and a display 55. In some embodiments, optical system 400*b* forms a virtual image 70 of an image 41 emitted by display 55 for viewing by an eye 80 when the eye is positioned proximate an eye-location 84 on an eye-side 301 of the optical lens assembly.

In some embodiments, for each first virtual image location 71 at a first field angle a1 of between about 5 degrees and about 30 degrees relative to the optical system axis 10, when an imaging system 140 centered on an imaging system axis 141 is positioned proximate the eye-location 84 and forms an image of the virtual image 70 corresponding to the first virtual image location 71, a resolution of the formed image increases as the imaging system 140 is at least rotated so that the imaging system axis 141 approaches the first field angle a1 (as shown in FIG. 8B). That is, in some embodiments, the perceived resolution of virtual image location 71 may increase (i.e., improve) when the as imaging system 140 is rotated to angle a1.

Figure 9:
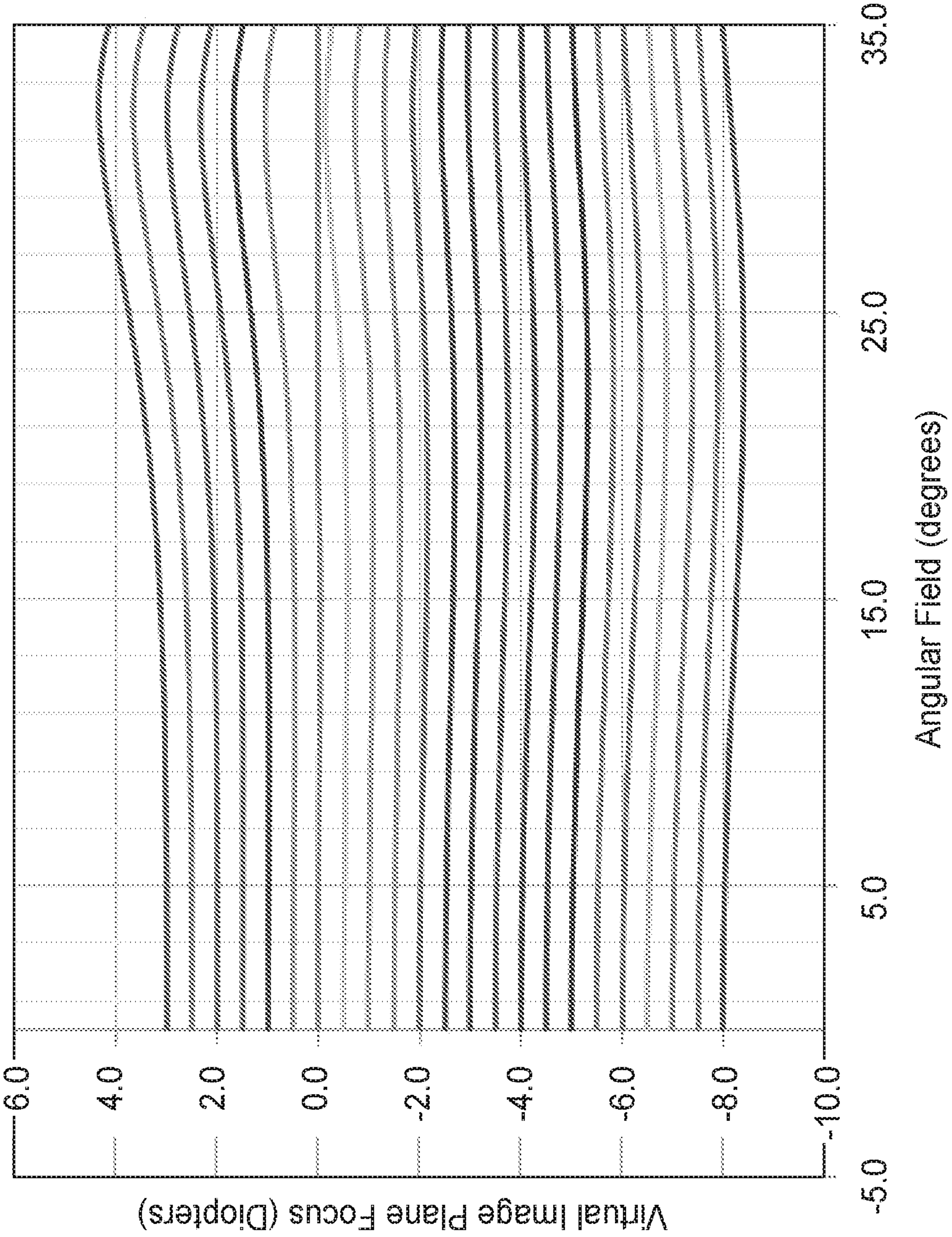
FIG. 9 provides plots of various diopter values across a diopter range extending at least from about −8 diopters to about 4 diopters from an angular field of about zero degree to about 35 degrees, in accordance with an embodiment of the present description.

FIG. 9 provides plots of various diopter values across a diopter range extending at least from about −8 diopters to about 4 diopters from an angular field of about zero degree to about 35 degrees for the optical lens assembly 300 of FIG. 1. Stated another way, FIG. 9 various diopter values based on changing (increasing or decreasing) the separation D shown in FIG. 1.

Each point in the data plots of FIG. 9 was calculated using an optical design software suite, following these process steps:

1) Adjusting the virtual image distance to the nominal diopter setting.
2) Adjusting the lens positions for best focus at the 0-degree field with a 5 mm pupil gazing forward with no rotation.
3) Rotating a 5 mm pupil around a point 12 mm behind the pupil (27 mm behind the lens) to each angular field point.
4) Optimizing the virtual image distance for best focus at each point and calculating the diopter value from the virtual image distance.

FIG. 9 shows the virtual image plane focus in diopters along the left vertical axis, and variations in the separation distance D on the right vertical axis. The x-axis shows a changing field of view angle ranging from about zero degrees to about 35 degrees. As shown in FIG. 9, for optical lens assembly 300 of FIG. 1, the optical lens assembly is configured to have focus that is adjustable across a diopter range extending at least from at least about −5 diopters to at least about 2 diopters by at least axially changing the separation D between the first optical lens 20 and the second optical lens 30, such that, for each focus position in the focus adjustment range, the diopter curvature is less than about 1 diopter as a field of view angle changes from about zero degrees to about 30, or from about zero degrees to about 35 degrees.

Figure 10:
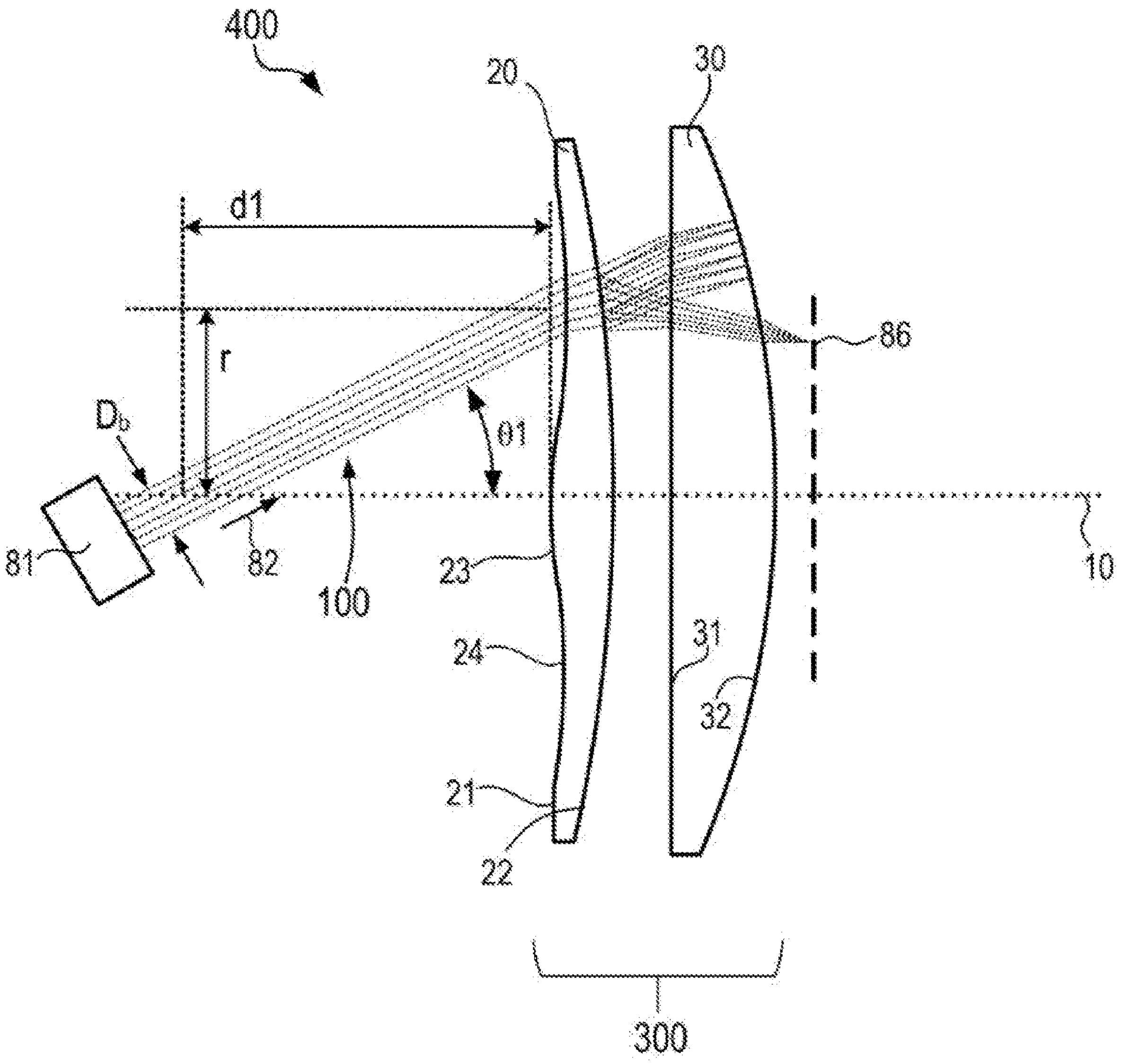
FIG. 10 is a side cutaway view of an optical system including an optical lens assembly and an imaging system, in accordance with an embodiment of the present description.

FIG. 10 is an alternate side cutaway view of optical system 400 including an optical lens assembly 300, according to the present description. Optical lens assembly 300 includes an optical system axis 10 and a first optical lens 20 having opposing first 21 and second 22 major surfaces and facing a second optical lens 30 having opposing third 31 and fourth 32 major surfaces. In some embodiments, the second major surface 22 and the third major surface 31 may face each other. As discussed elsewhere herein, the first major surface 21 includes a convex central portion 23 surrounded by an annular concave outer portion 24, the second major surface 22 is convex, the third major surface 31 is substantially planar, and the fourth major surface 32 is convex.

In some embodiments, the first through fourth major surfaces 21, 22, 31, 32 may have respective sags S1-S4 as a function of radial distance r from the optical axis. In some embodiments, as shown in FIG. 7, the plot of S1*S2 may have a first local peak 70 at a first radial distance r1 and the plot of S1*S2/S4 may have a second local peak 71 at a second distance r2 different from r1.

Figure 11:
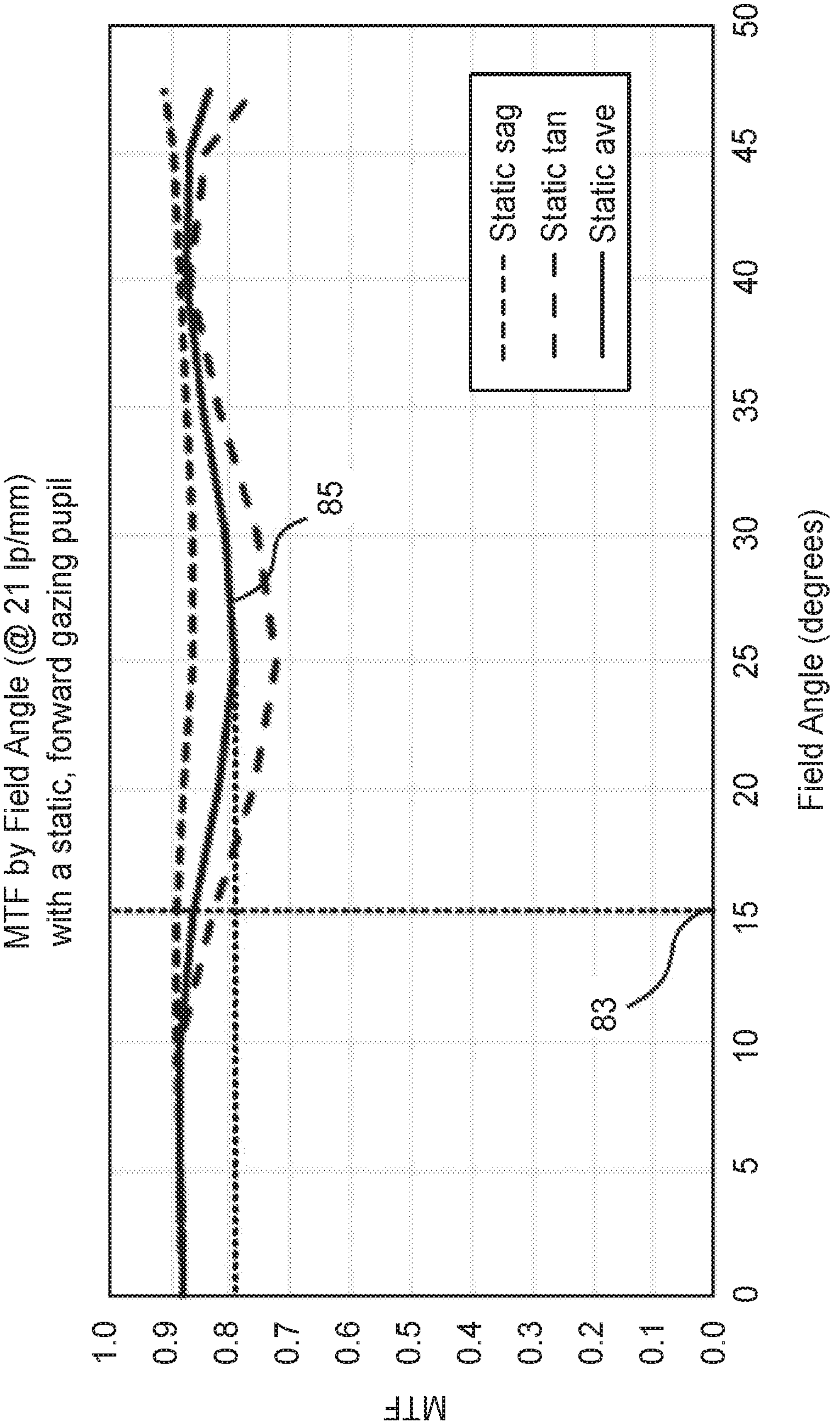
FIG. 11 provides a plot of modulation transfer function (MTF) values over a range of field angles for a static, forward gazing pupil, in accordance with an embodiment of the present description.

In some embodiments, when a substantially collimated light beam 100 from an object 81 propagates along a first direction 82, and intersects the optical system axis 10 at a first distance d1 of greater than about 20, or about 21, or about 22, or about 23, or about 24, or about 25, or about 26 mm from the first major surface 21 and is incident on the first major surface 21 side of the optical lens assembly 300 and focuses to a focal spot 84 after going through at least each of the first optical lens 20 and second optical lens 30, a modulation transfer function (MTF) of the optical lens assembly for the incident light beam at the focal spot for a static, forward-gazing pupil is greater than about 0.70, or greater than about 0.75, or greater than about 0.80, or greater than about 0.85 (see also FIG. 11, MTF plot 85). In some embodiments, the beam diameter of collimated light beam 100, $D_b$, is between about 4 mm and about 6 mm, or between about 3 mm and about 7 mm. In some embodiments, the object 81 may have a spatial frequency of between about 15 to about 25, or about 17 to about 23, or about 19 to about 23 line-pairs per millimeter. In some embodiments, first direction 82 may make a first angle □1 of at least 15 degrees with the optical axis. For the purposes of this specification, the modulation transfer function (MTF) used (reference number 85) refers to the average of the sagittal and tangential MTFs of the optical lens assembly 300.

FIG. 11 provides a plot of modulation transfer function (MTF) values referenced above in the description of FIG. 10, for at least some embodiments of the present description. FIG. 11 shows plots of the sagittal MTF, tangential MTF, and average MTF (line 85) at 21 line pairs/millimeter for a static, forward-gazing pupil. Looking at the average MTF plot 85, we see that the MTF values are greater than at least 0.70 or 0.75 at a field angle (□1 of FIG. 10) of 15 degrees (location 83) and higher angles of rotation.

Figure 12A:
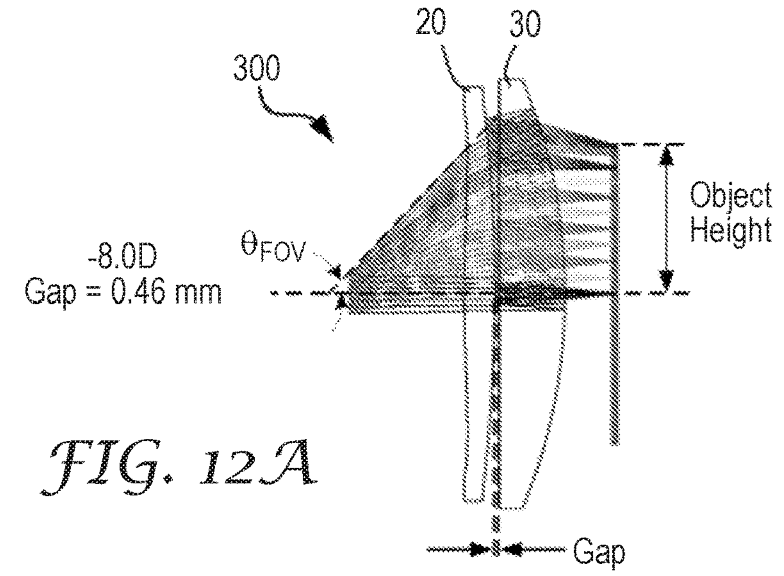
FIGS. 12A-12C illustrate how the focus of the optical lens assembly is adjusted by varying the position of one of the lens elements.
Figure 12B:
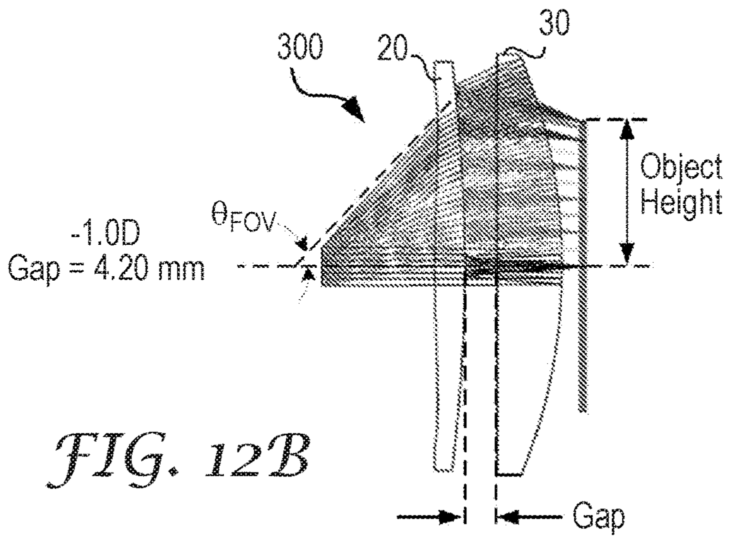
Figure 12C:
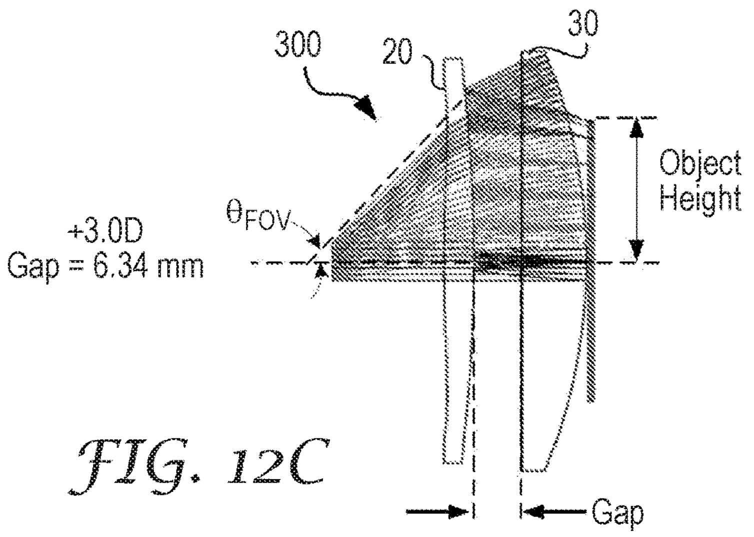

FIGS. 12A-12C illustrate how focusing a lens assembly for different diopter values can affect the object height needed to produce a virtual image with a fixed field of view. The focus of the optical lens assembly 300 may be changed by changing the separation (i.e., gap) between first optical lens 20 and second optical lens 30. In the example embodiments shown in FIG. 12A, optical lens assembly 300 is adjusted for a focus of −8 diopters (−8.0 D) by changing the gap between first optical lens 20 and second optical lens 30 to 0.46 mm. In the example embodiments shown in FIG. 12B, optical lens assembly 300 is adjusted for a focus of −0.5 diopters (−0.5 D) by changing the gap between first optical lens 20 and second optical lens 30 to 4.47 mm. In the example embodiments shown in FIG. 12C, optical lens assembly 300 is adjusted for a focus of 3 diopters (+3.0 D) by changing the gap between first optical lens 20 and second optical lens 30 to 6.34 mm.

In a perfectly object-space telecentric eyepiece, the angle subtended by the virtual image formed by the eyepiece of an object of fixed height would not change as the focus of the eyepiece is adjusted. In other words, in a perfectly object-space telecentric eyepiece the magnification would be constant through focus adjustments. In an eyepiece that is nearly telecentric in object-space, there will be slight change in the angle subtended by the virtual image formed by the eyepiece by an object of a given height. Although it is not very perceptible in FIGS. 12A-12C, there is a small change in the object height needed to produce the full field-of-view as the focus is adjusted. This small change is shown quantitatively in FIGS. 13B-13C.

It should be noted that, for simplicity, the angle $\theta_{FOV}$ shown in FIGS. 12A-12C represents half of a full field of view. That is, for a full field of view of 60 degrees, for example, the angle $\theta_{FOV}$ would be 30 degrees (assuming the full field of view is symmetrical about the system optical axis). In a truly telecentric optical system, changing the focus from one diopter to the next would have little to no effect on the magnification (i.e., the same object height would provide the same field of view, no matter the focus). However, an optical system that is nearly telecentric can be achieved using the methods described herein.

Figure 13A:
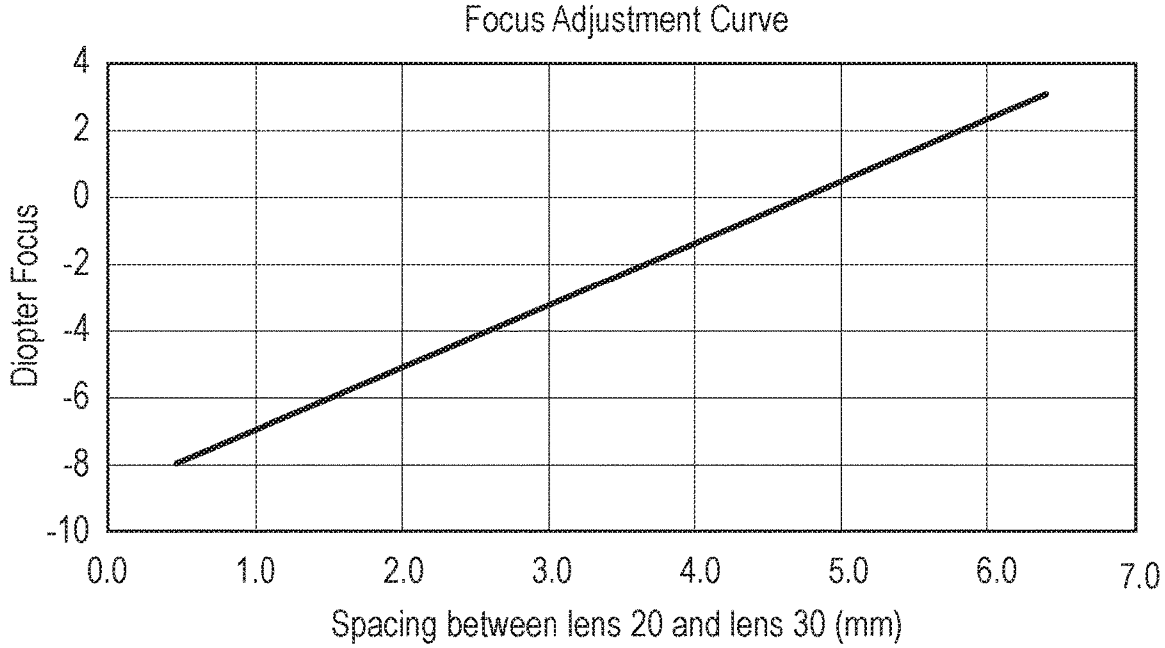
FIGS. 13A-13C illustrate the focus adjustment curve and magnification curve for an optical system, in accordance with an embodiment of the present description.
Figure 13B:
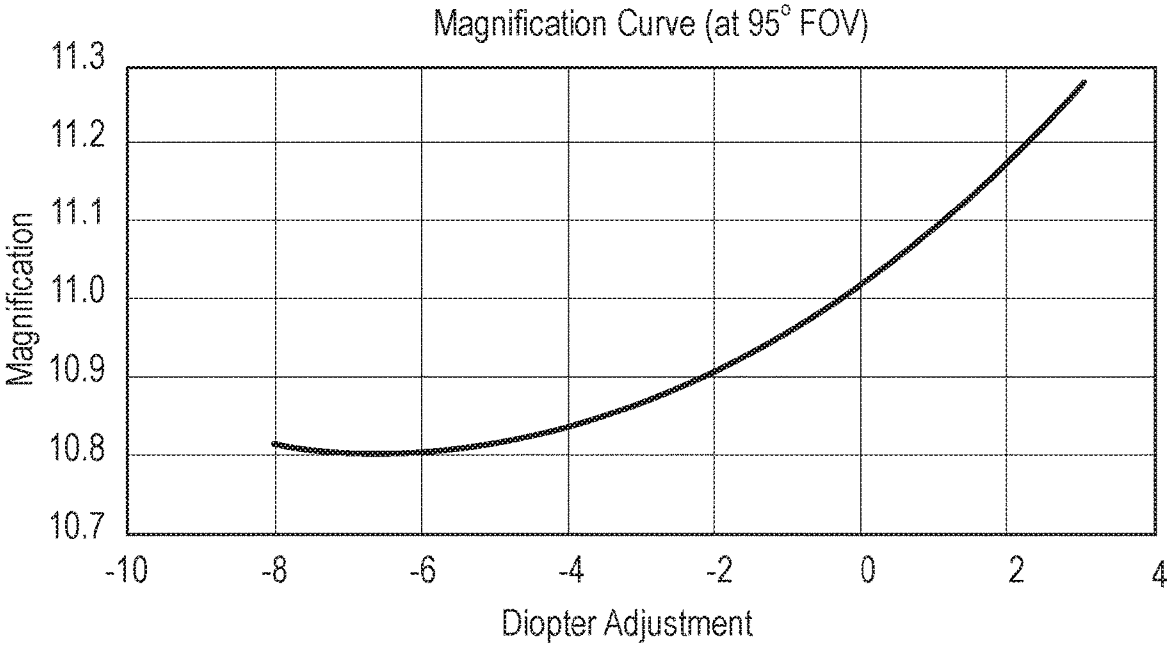
Figure 13C:
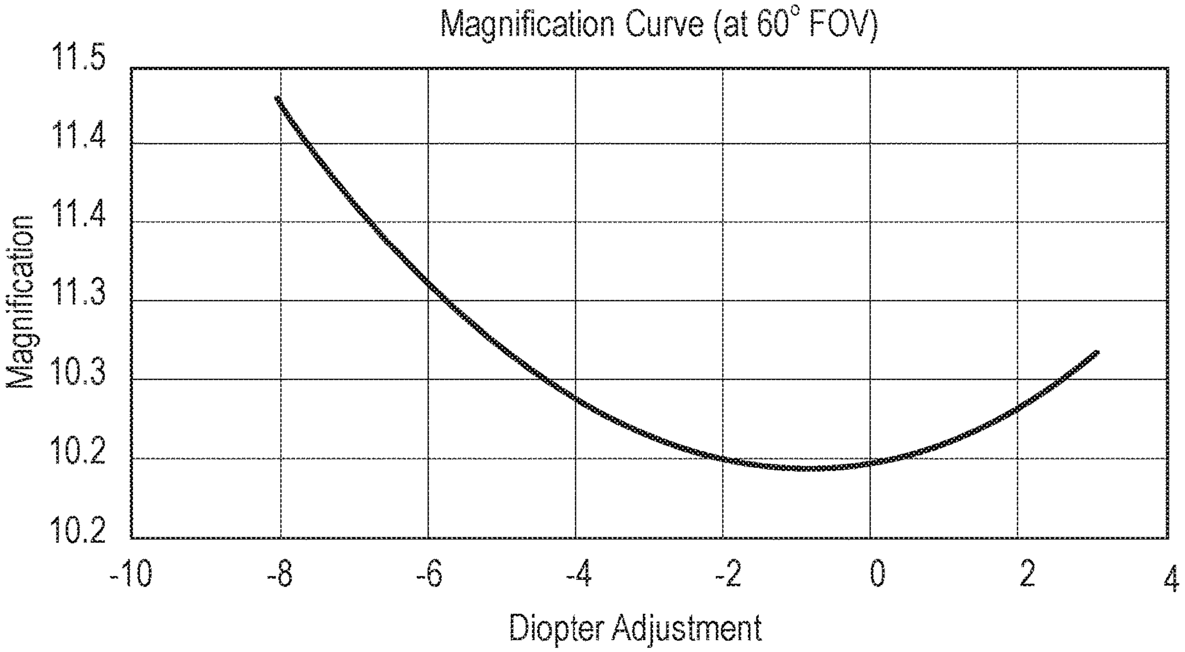

FIGS. 13A-13C illustrate the focus adjustment curve and magnification curves for an optical system as described herein, showing a nearly telecentric performance over a desired diopter range. FIG. 13A shows the focus adjustment curve of one embodiment of the present description, plotting diopter number (diopter focus) as it relates to the distance in millimeters (mm) between the first optical lens 20 and second optical lens 30 (see also FIG. 1). FIG. 13A shows how a gradual increase in spacing between the lens from about 0.46 mm to about 6.34 mm increases the diopter focus from about −8 diopters to about +3 diopters, representing a typical focus range accommodating the distribution of spherical refractive errors in a large portion of the human population. FIG. 13B shows the magnification calculated for a 95-degree field of view (+/−47.5 degrees from optical system axis) across a focus adjustment range between −8 diopters and about +3 diopters. The maximum value of magnification over the diopter range is 11.27, and the minimum value over this range (for a 95-degree field of view) is 10.80. The amount of change over the diopter range is calculated by taking the difference between the maximum and the minimum values and dividing this difference by the minimum value.

$$\text{Magnification change for } 95^\circ \text{full field of view} = (11.27-10.80)/10.80 \approx 4.35\%$$

Similarly, FIG. 13C shows the magnification curve for a 60-degree field of view (+/−30 degrees from optical system axis) for comparison purposes. The maximum value of magnification over the diopter range is 10.43, and the minimum value over this range (for a 60-degree field of view) is 10.20. Again, the amount of change over the diopter range is calculated by taking the difference between the maximum and the minimum values and dividing this difference by the minimum value.

$$\text{Magnification change for } 60^\circ \text{full field of view} = (10.43-10.20)/10.20 \approx 2.25\%$$

Calculating the magnification change for a 95-degree and 60-degree field of view extending over a smaller range of diopters (e.g., from −5 diopter to 1 diopter, or from −4 diopters to 0 diopters) can be shown to have smaller corresponding values for magnification change percentage (i.e., the magnification changes less over the smaller diopter range).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical lens assembly comprising an optical axis and a first optical lens comprising opposing first and second major surfaces and facing a second lens comprising opposing third and fourth major surfaces, the second and third major surfaces facing each other, the first through fourth major surfaces having respective sags S1-S4, wherein each of the sags is defined by:

$$S = \frac{cr^2}{1 + \sqrt{1 - (1 + k)c^2r^2}} + \alpha_2 r^4 + \alpha_3 r^6 + \alpha_4 r^8$$

where c is 1/radius of curvature of the major surface, k is the conic constant of the surface, r is a distance from the optical axis, and a is an aspheric deformation constant, wherein the first major surface comprises a convex central portion surrounded by an annular concave outer portion, the second major surface is convex, the third major surface is substantially planar, and the fourth major surface is convex, wherein for r extending from about 1 mm to at least about 25 mm:

$-0.7 \leq S1/S2 \leq 1$;

$-0.2 \leq S1/S4 \leq 0.4$; and a best fourth-order polynomial fit to each of the S1/S2 and S1/S4 has an r-squared value greater than about 0.95.

2. An optical system comprising the optical lens assembly of claim 1, a partial reflector disposed on and substantially conforming to the fourth major surface, and a reflective polarizer disposed on and substantially conforming to the second major surface, an optical system axis, and a display, the optical system forming a virtual image of an image emitted by the display for viewing by an eye when the eye is positioned proximate an eye-location on an eye-side of the optical lens assembly, such that for each first virtual image location at a first field angle of between about 5 degrees and about 30 degrees relative to the system axis, when an imaging system centered on an imaging system axis is positioned proximate the eye-location and forms an image of the virtual image corresponding to the first virtual image location, a resolution of the formed image increases as the imaging system is at least rotated so that the imaging system axis approaches the first field angle.

3. The optical system of claim 2, wherein the optical system axis is folded.

4. The optical system of claim 2, wherein the optical system axis is folded so that a first segment of the optical system axis substantially coincides with a different second segment of the optical system axis.

5. The optical lens assembly of claim 1 further comprising:

a partial reflector disposed on and substantially conforming to the fourth major surface; and a reflective polarizer disposed on and substantially conforming to the second major surface, wherein for a substantially normally incident light and a visible wavelength range extending from about 420 nm to about 680 nm:

the partial reflector has an average reflectance of at least 30% and an average transmittance of at least 30% for each of orthogonal first and second polarization states; and the reflective polarizer has an average reflectance of at least 60% for the first polarization state and an average transmittance of at least 60% for the second polarization state;

and wherein for a field of view of up to at least about 45 degrees, the optical lens assembly has a sagittal field curvature that varies by less than about 100 microns.

6. The optical lens assembly of claim 5, wherein for the field of view of up to the at least about 45 degrees, the optical lens assembly has a tangential field curvature that varies by less than about 200 microns.

7. The optical system of claim 2, wherein for a diopter range extending at least from about −8 diopters to about 3 diopters, a magnification of the virtual image changes by less than about 4.5% over a 95-degree field of view.

8. The optical system of claim 2, wherein for a diopter range extending at least from about −8 diopters to about 3 diopters, a height of an object needed to produce a virtual image with a field of view of 95 degrees varies by less than about 4.5%.

9. The optical system of claim 2, wherein for a diopter range extending at least from about −5 diopters to about 1 diopter, a height of an object needed to produce a virtual image with a field of view of 95 degrees varies by less than about 2.7%.

10. The optical system of claim 2, wherein for a diopter range extending at least from about −4 diopters to about 0 diopters, a height of an object needed to produce a virtual image with a field of view of 95 degrees varies by less than about 1.9%.

11. The optical system of claim 2, wherein for a diopter range extending at least from about −8 diopters to about 3 diopters, a magnification of the virtual image changes by less than about 2.5% over a 60-degree field of view.

12. The optical system of claim 2, wherein for a diopter range extending at least from about −8 diopters to about 3 diopters, a height of an object needed to produce a virtual image with a field of view of 60 degrees varies by less than about 2.5%.

13. The optical system of claim 2, wherein for a diopter range extending at least from about −5 diopters to about 1 diopter, a height of an object needed to produce a virtual image with a field of view of 60 degrees varies by less than about 1%.

14. The optical system of claim 2, wherein for a diopter range extending at least from about −4 diopters to about 0 diopters, a height of an object needed to produce a virtual image with a field of view of 60 degrees varies by less than about 0.6%.

15. An optical lens assembly comprising an optical axis and a first optical lens comprising opposing first and second major surfaces and facing a second optical lens comprising opposing third and fourth major surfaces, the second and third major surfaces facing each other, wherein the first major surface comprises a convex central portion surrounded by an annular concave outer portion, the second major surface is convex, the third major surface is substantially planar, and the fourth major surface is convex, the first through fourth major surfaces having respective sags S1-S4 as a function of radial distance r from the optical axis, wherein S1*S2 has a first local peak at a first radial distance r1 and S1*S2/S4 has a second local peak at a second distance r2 different from r1;

such that when a substantially collimated light beam with a beam diameter of between about 4 mm and 6 mm from an object comprising a spatial frequency of between about 15 to about 25 line pairs per millimeter propagates along a first direction, the first direction making a first angle of at least 15 degrees with the optical axis, intersects the optical axis at a first distance of greater than about 20 mm from the first major surface and is incident on the first major surface side of the optical lens assembly and focuses to a focal spot after going through at least each of the first and second optical lenses, a modulation transfer function (MTF) of the optical lens assembly for the incident light beam at the focal spot for a static, forward-gazing pupil is greater than about 0.7.

16. The optical lens assembly of claim 15, wherein the first distance is less than about 30 mm from the first major surface.

17. The optical lens assembly of claim 15, wherein at least one of ratios S1/S2 and S1/S4 is described by a fourth-order polynomial.

18. The optical lens assembly of claim 15, wherein the first local peak is a local maximum and the second local peak is a local minimum.

19. The optical lens assembly of claim 15, wherein the substantially collimated light beam has a full divergence angle of less than about 5 degrees.

20. An optical lens assembly comprising an optical axis and at least first and second optical lenses comprising:

a first major surface comprising a convex central portion surrounded by an annular concave outer portion, a convex second major surface, and a convex third major surface, the first through third major surfaces having respective sags S1, S2, and S4 as a function of radial distance r from the optical axis, wherein S1*S2/S4 has a local minimum;

a partial reflector disposed on and substantially conforming to the third major surface; and a reflective polarizer disposed on and substantially conforming to the second major surface, wherein the optical lens assembly is configured to have a focus that is adjustable across a focus adjustment range extending at least from about −5 diopters to about 2 diopters by at least axially changing a separation between the first and second optical lenses, such that for each focus position in the focus adjustment range, the diopter curvature is less than about 1 diopter as a field of view angle changes from about zero degree to about 30 degrees.

* * * * *